(12) United States Patent
Fermann et al.

(10) Patent No.: US 7,257,302 B2
(45) Date of Patent: Aug. 14, 2007

(54) IN-LINE, HIGH ENERGY FIBER CHIRPED PULSE AMPLIFICATION SYSTEM

(75) Inventors: Martin E. Fermann, Dexter, MI (US); Gennady Imeshev, Ann Arbor, MI (US); Ingmar Hartl, Ann Arbor, MI (US); Donald J. Harter, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 104 days.

(21) Appl. No.: 10/608,233

(22) Filed: Jun. 30, 2003

(65) Prior Publication Data

US 2004/0263950 A1    Dec. 30, 2004

Related U.S. Application Data

(60) Provisional application No. 60/474,999, filed on Jun. 3, 2003.

(51) Int. Cl.
G02B 6/02 (2006.01)

(52) U.S. Cl. .................................. 385/125; 385/127

(58) Field of Classification Search ............... 359/332, 359/333, 337.21, 569; 385/123, 125, 127
See application file for complete search history.

(56) References Cited

U.S. PATENT DOCUMENTS

| | | | |
|---|---|---|---|
| 4,815,079 A | | 3/1989 | Snitzer et al. |
| 5,307,436 A | * | 4/1994 | Berkey ....................... 385/123 |
| 5,450,427 A | | 9/1995 | Fermann et al. |
| 5,499,134 A | | 3/1996 | Galvanauskas et al. |
| 5,627,848 A | | 5/1997 | Fermann et al. |
| 5,689,519 A | | 11/1997 | Fermann et al. |
| 5,696,782 A | * | 12/1997 | Harter et al. .................. 372/25 |
| 5,802,236 A | | 9/1998 | DiGiovanni et al. |
| 5,818,630 A | | 10/1998 | Fermann et al. |
| 5,847,863 A | * | 12/1998 | Galvanauskas et al. .. 359/341.3 |
| 5,854,865 A | | 12/1998 | Goldberg |
| 5,862,287 A | | 1/1999 | Stock et al. |

(Continued)

FOREIGN PATENT DOCUMENTS

WO     WO 03/038486 A2     5/2003

(Continued)

OTHER PUBLICATIONS

Joseph C. Palais, *Fiber Optic Communications*, 1992, pp. 126-130, 3$^{rd}$ ed., Prentice Hall, US.

(Continued)

*Primary Examiner*—Mark Hellner
(74) *Attorney, Agent, or Firm*—Knobbe, Martens, Olson & Bear, LLP (57) ABSTRACT

By writing non-linear chirp into fiber Bragg gratings, greater control over dispersion compensation in CPA systems is obtained, such that, for example, the dispersion profile of the fiber Bragg grating and a bulk compressor may be matched. An iterative method of writing the fiber grating can reduce the group delay ripple to very low levels; and adaptive control of the fiber grating dispersion profile can further reduce these levels, while in addition offering greater acceptable yield in the manufacture of such gratings. Fiber Bragg gratings may be designed so as to provide customized pulse shapes optimized for various end uses, such as micromachining, for example, and may also be used to counteract gain-narrowing in a downstream amplifier.

26 Claims, 9 Drawing Sheets

U.S. PATENT DOCUMENTS

| | | |
|---|---|---|
| 5,864,644 A | 1/1999 | DiGiovanni et al. |
| 5,892,615 A | 4/1999 | Grubb et al. |
| 5,907,652 A | 5/1999 | DiGiovanni et al. |
| 6,072,811 A | 6/2000 | Fermann et al. |
| 6,151,338 A | 11/2000 | Grubb et al. |
| 6,198,568 B1* | 3/2001 | Galvanauskas et al. ..... 359/332 |
| 6,236,779 B1 | 5/2001 | Kafka et al. |
| 6,249,630 B1* | 6/2001 | Stock et al. ................. 385/123 |
| 6,389,198 B2 | 5/2002 | Kafka et al. |
| 6,433,306 B1 | 8/2002 | Grubb et al. |
| 6,621,040 B1* | 9/2003 | Perry et al. ............ 219/121.67 |
| 6,631,234 B1 | 10/2003 | Russell et al. |
| 6,738,549 B2* | 5/2004 | Inaba et al. ................. 385/123 |
| 6,788,865 B2* | 9/2004 | Kawanishi et al. ......... 385/125 |
| 6,823,093 B2* | 11/2004 | Chang et al. .................. 385/11 |
| 6,825,974 B2* | 11/2004 | Kliner et al. ............ 359/341.1 |
| 6,833,954 B2* | 12/2004 | Zweiback et al. .......... 359/566 |
| 7,116,875 B2 | 10/2006 | Wadsworth et al. |

OTHER PUBLICATIONS

Serge Huard, *Polarization of Light*, 1997, pp. 272-276, John Wiley & Sons, Chichester.

International Search Report and Written Opinion of the International Searching Authority for Intn'l Application No. PCT/US04/14526, Mailing date Nov, 21, 2005.

B. Desthieux, Appl. Phys. Lett., vol. 63, No. 5, pp. 586-588 (1993) "111 kW (0.5 mJ) pulse amplification at 1.5 μm using a gated cascade of three erbium-doped fiber amplifiers".

M. Sumetsky et al, Reduction of chirped fiber grating group delay ripple penalty through UV post process, Conference on Optical Communications, OFC, Atlanta (2003), paper PD 28).

* cited by examiner

Incoherent addition of femtosecond pulses

IN-LINE, HIGH ENERGY FIBER CHIRPED PULSE AMPLIFICATION SYSTEM

CROSS REFERENCE TO RELATED APPLICATIONS

This application claims benefit of Provisional Application No. 60/474,999, filed Jun. 3, 2003; the disclosure of which is incorporated by reference.

FIELD OF THE INVENTION

This invention relates to the construction of compact high energy fiber laser pulse sources, methods of designing and using such sources, and adaptive control techniques therefor.

BACKGROUND OF THE INVENTION

Over the last several years, fiber lasers and amplifiers have been regarded as the most promising candidates for pulse sources for industrial applications, due to their unique simplicity of construction. Large core fiber amplifiers and specifically large core diffraction limited multi-mode amplifiers (as described by M. E. Fermann and D. Harter, 'Single-Mode Amplifiers and Compressors based on Multi-Mode Optical Fibers', U.S. Pat. No. 5,818,630) enable the amplification of optical signals to levels where micro-machining and laser marking become possible. See A. Galvanauskas et al., U.S. patent application Ser. No. 09/317,221. Since laser marking and micro-machining are dependent on the supply of high peak power pulses, it is advantageous to use such fiber amplifiers for the amplification of nanosecond regime (ns) pulses, as supplied, for example, by micro-chip lasers or general Q-switched sources. In conjunction with large-core fiber amplifiers, these ns pulse sources can be amplified to pulse energies in the hundreds of microjoules (µJ). Such fiber amplifier systems can operate as direct replacements for Nd-based solid state lasers in any micro-machining and marking application.

The use of diffraction limited fiber multi-mode amplifiers allows a significant improvement in power density to be delivered to a target compared to non-diffraction-limited multi-mode amplifiers as described for example in B. Desthieux, Appl. Phys. Lett., vol. 63, No. 5, pp. 586–588 (1993)). Note, that in this early work the use of electrically driven semiconductor lasers for the generation of short optical seed pulses to high power amplifier chains, albeit with a final multi-mode power amplifier, was already described.

The use of electrically driven semiconductor lasers for amplifier chains was later reiterated by Grubb et al., U.S. Pat. No. 6,151,338. A variety of complex fiber amplifier implementations for use in micro-machining applications again reiterating the use of electrically driven semiconductor seed lasers was recently also suggested in U.S. Pat. No. 6,433,306 to Grubb et al. In another suggestion by Grubb et al., U.S. Pat. No. 5,892,615, the use of bent single-mode amplifier fibers has been suggested; the difficulty in making such single-mode amplifiers has also been a limitation in such high power fiber amplifier systems.

The most advanced micro-machining or micro-structuring applications are enabled by amplification of ultrafast optical pulses in fiber media. Ultrafast optical pulses are generally characterized by a pulse width of less than 50 ps; conveniently, chirped pulse amplification is implemented to enable the amplification of such pulses to the µJ-mJ energy range. Generally, chirped pulse amplification systems use a near bandwidth-limited seed pulse source, which is temporally stretched (i.e. chirped) in a pulse stretcher before amplification in a power amplifier. After amplification, the pulses are recompressed to approximately the bandwidth limit using a pulse compressor.

Commercially viable fiber chirped pulse amplification systems were suggested in A. Galvanauskas and M. E. Fermann, 'Optical Pulse Amplification using Chirped Bragg Gratings, U.S. Pat. No. 5,499,134). The system in this work relied on chirped fiber Bragg gratings for pulse stretching. Chirped fiber Bragg gratings have been developed into widely available commercial devices. The chirp imparted by the Bragg gratings can be designed to be linear or nonlinear to compensate for any order of dispersion in a chirped pulse amplification system. See A. Galvanauskas et al., Hybrid Short-Pulse Amplifiers with Phase-Mismatch Compensated Pulse Stretchers and Compressors, U.S. Pat. No. 5,847,863, which is important for the generation of near bandwidth limited pulses after pulse recompression.

Generally, in such systems, as a compromise between system compactness and high-energy capability, the use of a chirped fiber Bragg grating pulse stretcher in conjunction with a bulk grating pulse compressor is advantageous, providing at least partial integration of the high-energy fiber amplifier system. Alternative arrangements resorting to the use of bulk stretchers and compressors (as generally used in the state of the art) are generally much more difficult to align, require a significantly larger amount of space for their operation and are only of limited utility in real industrial applications.

However, to date, the mismatch in the dispersion profile between fiber grating pulse stretchers and bulk grating pulse compressors has limited the compressibility of the pulses, limiting their acceptance in the field of ultrafast optics.

Recently, modular, widely tunable fiber chirped pulse amplification systems were described by M. E. Fermann et al., 'Modular, High Energy Widely Tunable Ultrafast Fiber Source', U.S. patent application Ser. No. 09/576,772, that further enhance the utility of such fiber laser sources in industrial applications.

What remains to be demonstrated is a particularly cost-effective, easily manufacturable and flexible fiber chirped pulse amplification system that is practical for mass production, but yet exhibits high pulse stretching and compression ratios by benefit of matched dispersion profiles.

SUMMARY OF THE INVENTION

The present invention relates to the use of nonlinearly chirped fiber gratings as pulse stretchers in ultra-compact high energy chirped pulse amplification systems. By minimizing the group delay ripple of the fiber gratings and matching their dispersion to the dispersion of bulk grating compressors, accurately dispersion matched pulse stretchers and compressors can be constructed. Very large pulse stretching ratios can thus be implemented in compact chirped pulse amplification systems. Even larger stretching ratios are possible when using concatenated fiber Bragg gratings.

Chirped fiber Bragg gratings can be implemented as pulse stretchers for both solid-state amplifier-based and fiber amplifier-based chirped pulse amplification systems. With regards to fiber chirped pulse amplification, the obtainable pulse energies can be maximized by using polarization maintaining, large-core fiber amplifiers. For ease of alignment, and to help maintain single mode operation, fibers with approximately step-like refractive index profiles and circularly symmetric rare-earth doping profiles are preferred.

Very high average powers can further be obtained by the implementation of double-clad fiber amplifiers. The spectral output of these amplifiers can be optimized by accurate control of the linear polarization state propagating inside the fiber amplifiers.

Adaptive control of the group delay variations in fiber Bragg gratings can further be performed to enable the minimization of group-delay ripple-induced pulse distortions due to chirped fiber Bragg grating imperfections. Adaptive control of the chirp in fiber gratings is enabled by controlling the temperature and/or pressure (stress) inside distinct fiber grating sections. Adaptive control of the group delay variations in chirped fiber gratings can further be used to compensate for self-phase modulation in high energy amplifiers.

The combination of fiber grating pulse stretchers and bulk grating compressors allows the generation of a variety of complex pulse shapes optimized for use in advanced microstructuring applications.

Finally, fiber grating pulse stretchers can be designed to counteract spectral gain-narrowing in a chirped pulse amplification system, allowing for the generation of pulses with a bandwidth comparable to the gain bandwidth of the optical amplifiers incorporated in the chirped pulse amplification system.

DESCRIPTION OF THE PREFERRED EMBODIMENT

Figure 1:
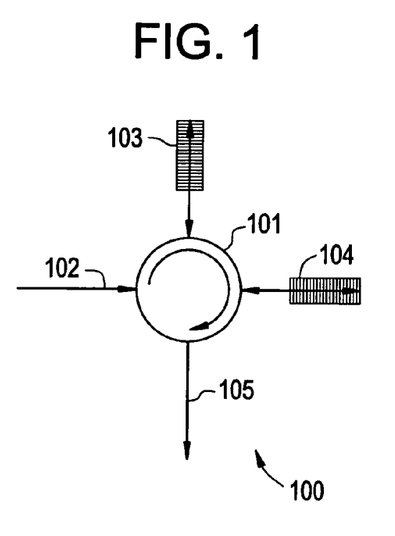
FIG. 1 is a diagram of a generic scheme for concatenating two low group delay ripple chirped fiber Bragg gratings.

FIG. 1 represents an exemplary embodiment of the invention showing a compact pulse stretcher 100 as applicable in a generic chirped pulse amplification system. The pulse stretcher uses circulator 101 to circulate the optical signal from circulator port 102, via chirped fiber Bragg gratings 103 and 104 to port 105, port 102 representing the fiber input and port 105 representing the fiber output. Pulse stretching is obtained in the two concatenated chirped fiber Bragg gratings 103 and 104. By adding further circulators to port 105, a large number of fiber Bragg gratings can be concatenated. By concatenating several chirped fiber gratings, very long stretched pulses can be obtained even with relatively short chirped fiber Bragg gratings. Generally, the length of chirped fiber Bragg gratings is limited to around 10 cm with current manufacturing methods, allowing for maximum stretched pulse widths of about 1 ns, independent of the input pulse width. By concatenating 4 gratings for example, stretched pulse widths up to 4 ns can be obtained, allowing an increase in pulse energy in a chirped pulse amplification system by a factor of 4. Specifically, assuming an input pulse width of 200 fs, a pulse stretching factor of up to 20,000 times can be obtained with a total fiber grating length of 40 cm in a pulse stretcher arrangement. Even larger pulse stretching factors can be implemented in principle, but are not considered practical for industrial laser systems because of the large size (>40–50 cm) and cost of the required compressor grating or gratings.

However, by utilizing multiple grating stretchers, a longer pulse envelope can be generated that can be amplified to higher energies. One means to accomplish this is to have each of the stretcher gratings stretch only a portion of the spectrum of the input pulse. It is possible to coherently add the pulses back to form a single pulse, although it is difficult to maintain phase in such a case. Longer pulse envelopes from such a series of gratings can be recompressed by a series of similar compression gratings. The pulses can be incoherently added. The pulses can not be recompressed to the same degree as if a single grating is used, although this may be sufficient for many purposes.

The use of stretched pulses with a width of, for example, 4 ns enables the amplification of these pulses to the mJ energy level in large-core (≈30 μm mode diameter) Yb-doped fiber amplifiers. Such high pulse energies are very important for the application of ultrafast fiber laser sources to industrial scale machining applications.

Though in FIG. 1 an implementation of a pulse stretcher using a fiber optical circulator is shown, the optical circulator can be replaced with a simple polarization beam splitter and appropriate waveplates and Faraday rotators to circulate the beam between the 4 optical beam paths. Such optical assemblies are well known in the art and are not separately shown. Another alternative is the use of 3 or 4 port fiber couplers operated in reflection to concatenate several fiber Bragg gratings. The use of fiber couplers leads to an optical loss of at least 6 dB each time a fiber Bragg grating is traversed and is therefore not ideal. Another alternative is the use of a Michelson interferometer constructed from a 4 port fiber coupler; by configuring a 4 port fiber coupler as a Michelson interferometer the 6 dB loss in recirculating through the grating can be avoided.

Figure 2:
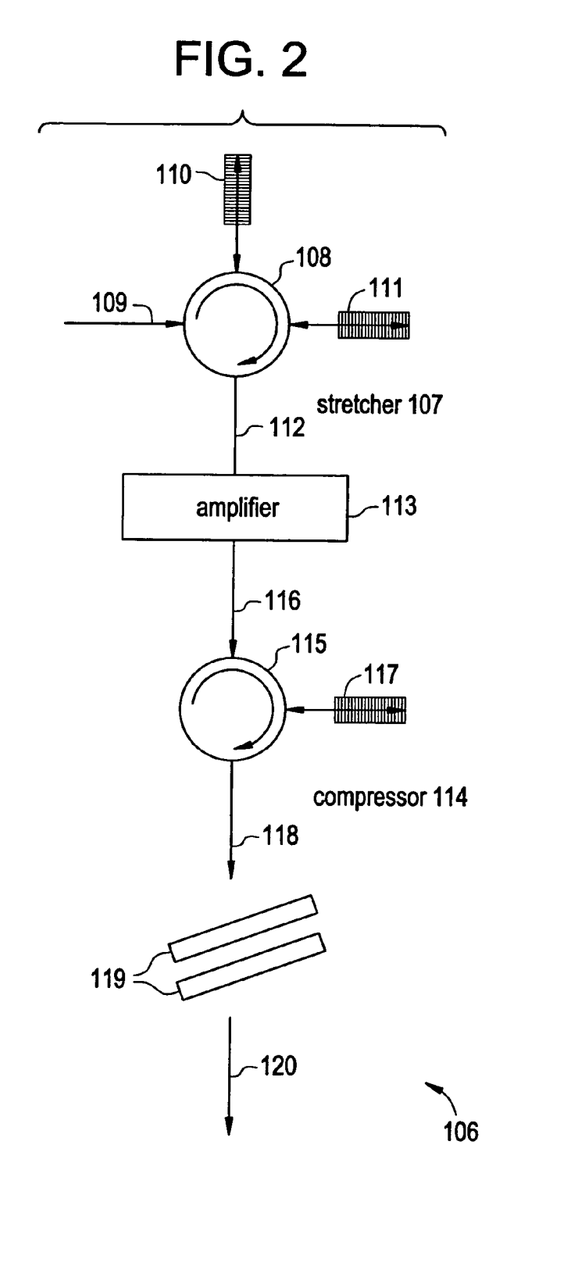
FIG. 2 is a diagram of a compact scheme for a chirped pulse amplification system using concatenated chirped fiber Bragg gratings in pulse stretching and compression.

The preferred application of the pulse stretcher as shown in FIG. 1 is in a chirped pulse amplification system, as exemplified with the optical arrangement 106 in FIG. 2. The pulse stretcher comprising elements 108–112 is configured as in FIG. 1. It is further assumed that a short optical pulse from an appropriate pulse source is injected into circulator port 109. The pulses from the stretcher 107 are amplified in amplifier 113 and partially compressed in fiber compressor 114, comprising circulator 115, fiber input 116, chirped fiber Bragg grating 117 and fiber output 118. Final pulse compression is performed in bulk grating compressor 119 and the output from the system is designated with arrow 120. Here the orientation of chirped fiber Bragg grating 117 in partial compressor 118 is opposite to the orientation of the chirped fiber Bragg gratings in stretcher 107, i.e. the direction of the grating chirp is reversed. If gratings 110, 111 and 117 are nearly identical, grating 117 compensates for half of the pulse stretching induced by pulse stretcher 107. Hence the grating separation in bulk compressor 119 (i.e. the required optical beam paths) is also reduced by 50% (compared to a system without partial fiber compressor 117) for optimum pulse compression. Therefore the physical extent of the compressor assembly can also be minimized, which is important in any industrial application. The size of optical assembly 106 can further be minimized when employing positively chirped fiber stretcher gratings and negatively chirped fiber compressor gratings as well as a bulk grating compressor providing negative dispersion. Here a positively/negatively chirped fiber grating provides the smallest/largest group delay for the longest/shortest optical wavelengths inside the pulse spectrum, respectively.

Moreover, as is well known in the art, in the assembly of negative dispersion bulk gratings compressors, no lenses are required in the dispersive section of the optical beam path (i.e. the optical beam path that provides the wavelength dependent group delay), greatly simplifying its construction.

Bulk compressor 119 as indicated in FIG. 2 is drawn only schematically, in fact, bulk compressor 119 represents two transmission gratings operated near the Littrow angle and aligned plane parallel with respect to each other. A single pass through a bulk grating pair 119 as shown produces temporally compressed pulses with a spatial chirp across the output beam. However, any spatial chirp can be eliminated by simply double-passing the output beam through the bulk grating pair. For ultra-low loss gratings, passing the output beam 4 or even eight times through a bulk grating pair may be considered. Such optical arrangements are well known in the art and are not further discussed here. Equally, plane parallel reflective gratings pairs could be employed in the compressor or a compressor design based on a single transmission/reflection grating with the optical beam path being diffracted by the single grating four times. Equally, bulk optic equivalents of chirped fiber Bragg gratings as discussed in A. Galvanauskas et al, U.S. Pat. No. 5,499,134 can also be implemented as pulse compressors. Such assemblies are also well known in the art and are not further discussed here.

Although, the present example refers to a dual fiber grating stretcher and a single fiber grating partial compressor, any number N of fiber gratings can be used in the stretcher. The number of fiber gratings in the compressor can then be selected between 1 to N, where the residual uncompensated group delay is compensated with a bulk grating compressor. The amplifier 113 can comprise a fiber, semiconductor or bulk laser amplifier. Alternatively, nonlinear amplifiers such as a Raman or parametric amplifers can also be implemented, where implementations in both waveguide (fiber) or bulk optical form are acceptable. In conjunction with bulk amplifiers, it is advantageous to implement multiple passes through the amplifier medium or to implement a regenerative optical amplifier. Such optical systems are well known in the art and amplifier 113 is representative of any such bulk optical amplification system. A plurality of amplifiers can be used. Either the same or different type.

The system shown in FIG. 2 can be further implemented in a compact fiber optic pulse delivery system. Fiber delivery systems have previously been discussed in U.S. Pat. Nos. 5,862,287 and 6,249,630 to Stock et al. and later by Kafka et al. in U.S. Pat. Nos. 6,236,779 and 6,389,198. In the most basic implementation, compressor 119 is omitted and the dispersion of the fiber grating stretcher/compressor assembly is adjusted to obtain optimally compressed pulses at output 118. Alternatively, the dispersion inside the fiber grating stretcher/compressor assembly can be adjusted to obtain optimally compressed pulses after propagation of the pulses from output 118 through a coupled functional end-use system having an additional optical assembly, such as an optical lens assembly or simply a piece of solid glass, in place of or in addition to compressor 119. Thus, the pulses may be "preconditioned" so as to be delivered in an optimal state after passing through the subsequent optics (of known dispersion characteristics) of an end-use apparatus. Moreover, the output pulses designated by arrow 120 can be coupled into a low-nonlinearity holy or photonic bandgap pulse delivery fibers; providing for guided propagation via holes surrounding a fiber core or even providing for guided propagation predominantly inside an air-hole as well known in the state of the art. The fiber gratings can thus be implemented to compensate for the dispersion of these fibers to produce the shortest possible pulse at the end of these delivery fibers. Note that the work by Kafka did not provide for any provision to compensate for the dispersion of the photonic bandgap delivery fiber. The holy or photonic bandgap fiber can also be engineered to provide the correct dispersion to be used as pulse compressor or partial pulse compressor for a stretched pulse. Such pulse compressor and partial pulse compressor function of the holy or photonic bandgap fibers can be used in combination with the power delivery function of the same fibers.

To enable re-compression of the stretched pulses obtained from a chirped fiber grating stretcher in a bulk grating compressor, the group delay as a function of wavelength in the chirped fiber Bragg grating assembly has to be matched to the group delay as a function of wavelength generated in the bulk grating compressor. This is performed by balancing the spectral phase of the stretcher/compressor assembly. Generally, the group delay as a function of optical frequency produced by a highly dispersive bulk grating compressor is nonlinear, hence the chirped fiber Bragg grating stretcher needs to be designed with the opposite nonlinear group delay as a function of optical frequency. The nonlinear group delay can also simply be referred to as nonlinear chirp.

Generally, it is very difficult to match the nonlinear chirp produced by the stretcher/compressor assembly perfectly.

Due to phase errors in the fiber grating stretcher, in general the fiber grating stretcher will exhibit periodic variations of the group delay from the design curve. The group delay variations produced in a fiber grating can be measured using standard techniques well known in the art. The group delay mismatch between stretcher and compressor can then be measured or calculated (generally, it is sufficient to calculate the group delay produced by a bulk grating compressor; a separate measurement is not necessary) and the results can be fed back to the fabrication process of the fiber grating, i.e. the dc or the ac component in the writing procedure of a fiber Bragg grating can be appropriately modified to reduce the group delay mismatch between fiber grating stretcher and bulk compressor. Through an iterative process very low group delay mismatch between stretcher and compressor can be obtained.

Note that iterative methods to minimize the group delay of chirped fiber gratings have been demonstrated (M. Sumetsky et al., 'Reduction of chirped fiber grating group delay ripple penalty through UV post processing, Conference on Optical Communications, OFC, Atlanta (2003), paper PD28), though to the author's knowledge the iterative method of group delay ripple reduction has not previously been suggested in the construction of high energy chirped pulse amplification systems. As is evident in the article by Sumetsky et al., without iterative group delay ripple reduction, a group delay ripple as large as ±10 ps is generated even in high-quality chirped fiber Bragg gratings. With iterative group delay ripple reduction, the group delay can be reduced to ±2 ps and even smaller values are possible. For pulse compression down to below 1 ps the control of group delay ripple is becoming increasingly significant, in eliminating an unwanted pulse pedestal, which can be detrimental in advanced material processing applications.

Figure 3:
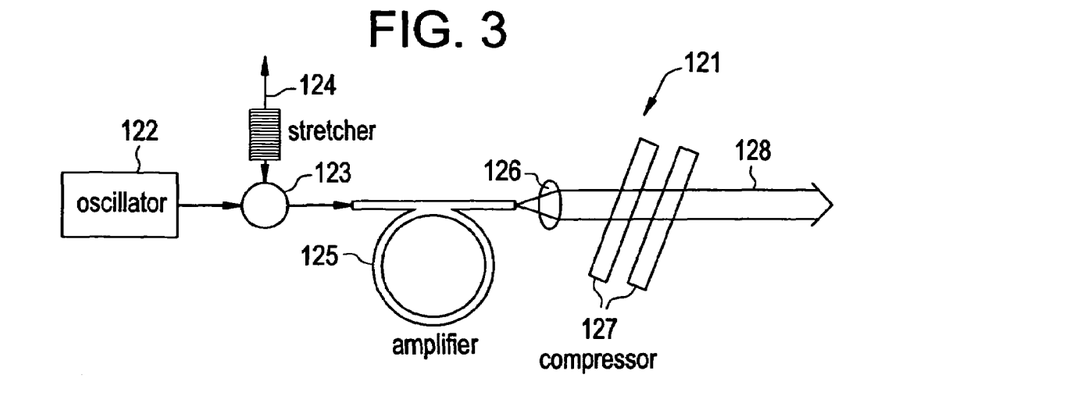
FIG. 3 is a diagram of a generic in-line fiber-based chirped pulse amplification system.

Referring now to FIG. 3, optical assembly 121 represents an example of a fiber-based chirped pulse amplification system. Short optical pulses from preferably a short pulse fiber oscillator 122 (as for example described in U.S. Pat. Nos. 5,689,519; 5,450,427; 5,627,848; and 6,072,811 all to Fermann et al.) are injected into circulator 123 and stretched in nonlinearly chirped fiber Bragg grating 124. The stretched pulses are subsequently amplified in fiber amplifier 125. Fiber amplifier 125 is preferably based on a double-clad fiber pumped with a high power multi-mode diode laser, though single-clad fiber amplifiers pumped with high power single mode diode lasers can also be implemented. End-pumped or side-pumped amplifier designs can be implemented; as discussed for double-clad fibers in U.S. Pat. No. 5,854,865 to L. Goldberg; U.S. Pat. No. 4,815,079 to E. Snitzer et al.; and U.S. Pat. No. 5,864,644 to DiGiovanni. Such pumping arrangements are well known in the art and not further discussed here. Collimation lens 126 collimates the amplified pulses emerging from the amplifier and a single or double pass through bulk grating compressor 127 provides compression down to the bandwidth limit. The direction of the output pulses is exemplified with arrow 128.

WORKING EXAMPLE 1

Figure 4:
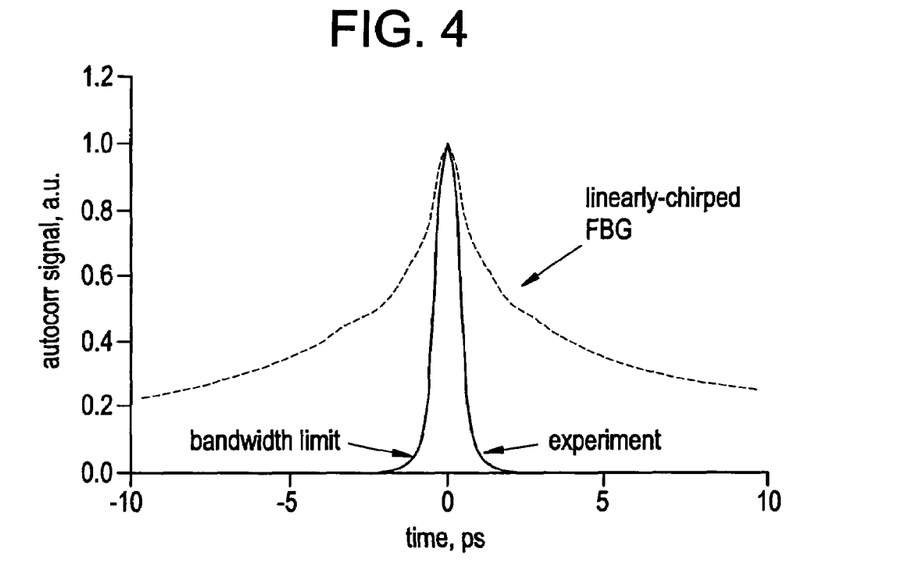
FIG. 4 is an autocorrelation trace obtained with an exemplary fiber-based chirped pulse amplification system.

In a system demonstration, pulses with a full width half maximum (FWHM) width of 350 fs from a passively modelocked Er fiber oscillator operating at a repetition rate of 50 MHz were stretched in a 10 cm long nonlinearly chirped fiber Bragg grating to a width of 700 ps. The nonlinearly chirped fiber grating was designed (e.g., by the iterative method) to provide the same dispersion as the bulk grating compressor; the bulk grating here having a groove spacing of 1200 lines/mm and operated at the Littrow angle. The maximum group delay variations (or group delay ripple) from the designed group delay in the chirped fiber Bragg grating were measured at ±<2 ps. The oscillator pulse energy was 100 pJ. After amplification by a factor of 10, the pulses were recompressed in the bulk grating compressor. The recompressed pulses had a FWHM width of ≈700 fs sitting on an additional pedestal with a FWHM width of 3 ps, containing about 2% of the pulse energy. Hence a compression ratio of up to 1000 was obtainable with the present arrangement, limited only by the bandwidth of the amplifier. An autocorrelation of the compressed pulses with a 2% pedestal energy content is shown in FIG. 4.

Though the amplified pulse energy in the present system was only 1 nJ, by reducing the repetition rate of the seed source, and the incorporation of additional fiber amplifier stages, much higher pulse energies can be generated. It is therefore instructive to calculate the practical energy limits of the present chirped pulse amplification system. The maximum obtainable pulse energy E can be expressed as $$E = \Phi_{nlmax} \tau_{st} / \gamma_{eff} L_{eff},$$

where $\Phi_{nlmax}$ is the maximum tolerable nonlinear phase delay (as induced by self-phase modulation) inside the fiber amplifier, $\tau_{st}$ is the FWHM width of the stretched pulses, $\gamma_{eff}$ is the effective nonlinearity parameter of the fiber and $L_{eff}$ is the effective length of the final fiber power amplifier. For a large mode fiber with a mode diameter of 30 µm (which is generally obtainable with diffraction limited multi-mode fibers as discussed in U.S. Pat. No. 5,818,630)$\gamma_{eff}$ can be calculated as $\gamma_{eff} = 2 \times 10^{-4}$/mW at a wavelength of 1550 nm. Highly Er doped silica fibers allow an effective amplifier length shorter than 0.5 m. Moreover, for waveguide amplifiers $\Phi_{nlmax} \approx 10$ can be tolerated without significant pulse distortions. Hence, for a stretched pulse width of $\tau_{st} = 4$ ns, output sub-picosecond pulses with a pulse energy larger than 400 µJ can be safely generated in a large mode fiber with this system.

Regarding size constraints, the bulk compressor could fit into a box with a length of 2 m using 4 passes through a single bulk grating. Using additional optical folding, a compressor size of 1 m could be obtained. Considering that such laser systems would be used in heavy industrial machining (or other applications), located in a large factory hall, a box length of 1 m poses no significant obstacles.

Figure 5:
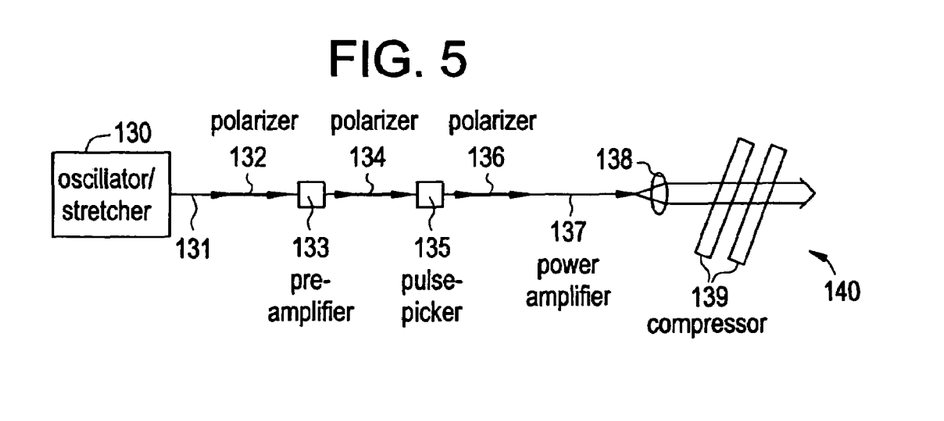
FIG. 5 is a diagram of an in-line fiber-based chirped pulse amplification system with optimized polarization control.

Referring now to FIG. 5, an alternative basic fiber-based chirped pulse amplification system 129 based on predominantly polarization maintaining (PM) fibers is illustrated. System 129 comprises an integrated oscillator/fiber grating pulse stretcher assembly 130, with a PM fiber pig-tail output 131. A polarizer 132 (fiber or bulk) is inserted before PM fiber pre-amplifier 133. A second polarizer 134 is inserted before pulse picker 135, which is used to down-count the repetition rate set by the oscillator by a selectable factor, thus providing seed pulses with a reduced repetition rate to the rest of the amplifier system. Another polarizer 136 is inserted before PM fiber power amplifier 137. Lens 138 is used to produce a collimated output from power amplifier 137. A single or double pass (or quadruple pass) through bulk compressor 139 provides final pulse compression and the direction of the output pulses is designated with arrow 140.

PM fibers are preferably constructed using fibers with an internal birefringence Δn, where $\Delta n > 5 \times 10^{-5}$ and preferably $\Delta n > 1 \times 10^{-4}$. A fiber with a birefringence $\Delta n = 1 \times 10^{-4}$ produces a polarization beat length $l_b$ of $l_b = \lambda/\Delta n = 10$ mm at a wavelength of 1050 nm. When launching a linear polarization state into a birefringence axis of such a fiber, the linear polarization state can be preserved over lengths of several meters with only minimal cross coupling to the orthogonal polarization axis. The leakage to the orthogonal polarization axis can be as small as −40 dB, i.e. the cross coupling to the orthogonal polarization state can be as small as 0.01%.

Assuming now that a linearly polarized pulse is launched with an angular rotational misalignment $\alpha$ with respect to a polarization axis of the fiber, this polarization axis is excited with a relative intensity of $\cos^2 \alpha$ and the orthogonal fiber polarization axis is excited with a relative intensity of $\sin^2\alpha$.

Due to group velocity walk off in the PM fiber, at the PM fiber output, two time delayed pulses propagating in the two orthogonal polarization axes are generated with the main pulse having a relative intensity of ≈1 and the leakage pulse having a relative intensity of $\sin^2\alpha$. The time delay between the pulses is given by $\tau_d \approx L\Delta n/c$, where L is the fiber length and c is the velocity of light. For a 3 m fiber length and $\Delta n=1\times10^{-4}$, the time delay between the pulses is calculated as $\tau_d=1$ ps. When a second PM fiber is spliced to the first fiber with an angular misalignment of $\beta$, the leakage pulse couples to the main pulse generating a time delayed pulse in the same polarization state as the main pulse with a relative intensity of $\sin^2 \alpha \sin^2 \beta$. Assuming $\alpha=\beta$ the leakage pulse has a relative intensity of $\sin^4 \alpha$.

The leakage pulse in turn provides a modulation on the spectral output of the system with a frequency $f=1/\tau_d$. For a time delay of 1 ps, the modulation frequency corresponds to a sinusoidal perturbation of the optical spectrum of 8 nm. The depth of the spectral perturbation corresponds to ≈4 $\sin^2\alpha$; i.e. for a leakage pulse with a relative intensity of 1%, the corresponding relative modulation of the optical spectrum is ≈40%. The spectral modulation depth is typically further amplified in high gain amplifier systems and can degrade the obtainable pulse quality. When concatenating several sections of polarization maintaining fiber, very large spectral modulations can be obtained in high gain fiber amplifier systems leading to substantial degradation of pulse quality, especially in the presence of self-phase modulation.

To limit the polarization leakage induced spectral modulations in in-line fiber chirped pulse amplification systems it is therefore preferable to minimize the number of polarization maintaining fiber sections and to insert high extinction polarizers or fiber polarizers between sections of polarization maintaining fiber as shown in FIG. 5. These polarizers limit the formation of time delayed leakage pulses propagating in the same polarization direction as the main pulse. If the required pulse quality is not very critical, however, the in-line polarizers can be omitted and a very low-cost and simple design can be obtained.

Figure 6A:
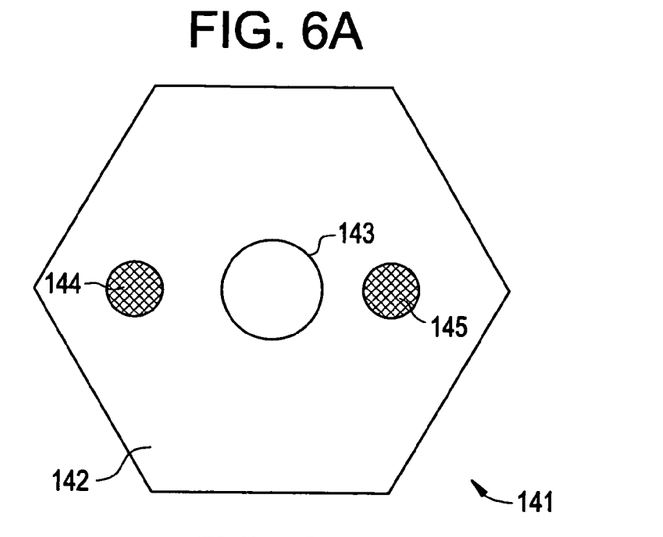
FIG. 6a. is a cross section of a polarization maintaining, few-moded, large-core double-clad fiber.
Figure 6B:
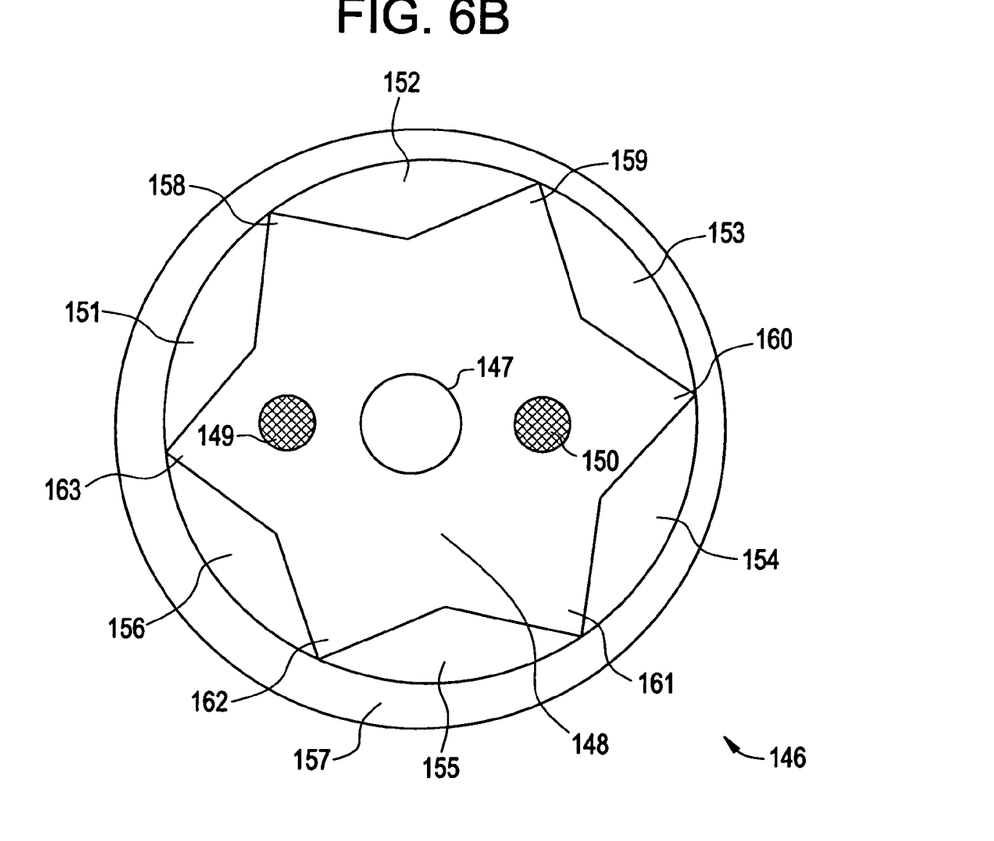
FIG. 6b. is a generic cross section of a polarization maintaining, few-moded, large-core air-clad fiber.

Referring now to FIGS. 6a and 6b, two alternative embodiments of PM high power fiber amplifiers are shown. FIG. 6a shows the cross section of a double clad large mode fiber 141. The fiber comprises a first cladding 142, a rare-earth-doped core 143 with a diameter>15 μm and stress producing regions 144, 145. To enable pumping with a high power multi-mode semiconductor laser, cladding 142 is further surrounded with a polymer or glass cladding with a lower refractive index compared to cladding 142. The second cladding is not separately shown. Additional polymer coating can be applied to the outside of the second cladding. A variety of fiber designs and cladding shapes for PM high power fiber amplifiers are discussed in U.S. patent application Ser. No. 09/809,248 to Fermann et al. and need not be further reiterated here.

A limitation with the fiber design from FIG. 6a is the limited numerical aperture of the cladding, which limits the amount of power that can be coupled into the fiber. A higher cladding numerical aperture can be obtained with an air-clad fiber 146 as shown in FIG. 6b. Here the fiber core 147 has preferably a diameter of more than 15 μm. Core 147 is surrounded by first cladding 148 containing stress producing regions 149, 150 to induce a high amount of birefringence in the fiber to enable PM operation. The first cladding 148 is in turn surrounded by a second cladding, comprising air-holes 151–156. The first cladding is further attached to a third cladding 157 at bridge points 158–163. To maximize the numerical aperture of the air cladding 151–156, the bridge points 158–163 between first cladding 148 and third cladding 157 are made as small as possible. For additional protection third cladding 157 can further be surrounded by a protective coating; alternatively a gold coating (or other metal coating) can be deposited on third cladding 157 to enable soldering of the fiber to a heat sink. Any coatings outside third cladding 157 are not separately shown.

Though a star-shaped air-cladding is shown in FIG. 6b, other forms such as ring segments separated by glass bridges between the first and third cladding are equally possible. Alternatively, closely spaced air-holes located between the first and third cladding can also be implemented. Various cladding shapes for air-clad fibers are well known in the art and are not further discussed here.

The numerical aperture of the cladding of a fiber according to FIG. 6b can be about 50% higher than the numerical aperture of the cladding of a fiber similar to FIG. 6a. Hence for diode pump sources with a given brightness B, more than twice as much power can be coupled into air-clad fibers similar to the type shown in FIG. 6b compared to fibers similar to the design shown in FIG. 6a.

Figure 7A:
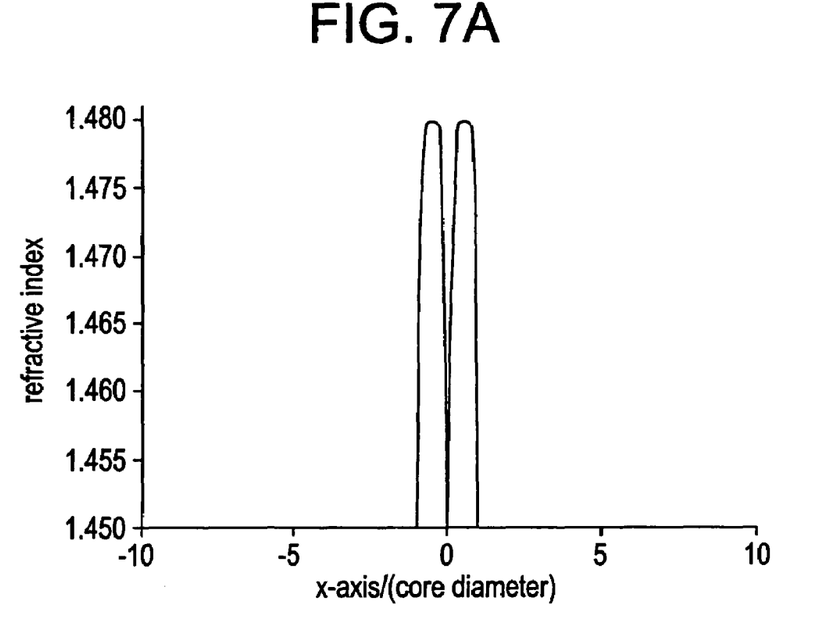
FIG. 7a is a diagram of the refractive index profile of a fiber with a co-axial, central refractive index dip.

Referring now to FIG. 7, some design considerations specific to the large-core MM fiber lasers typically used in the invention will be discussed. In the design of diffraction-limited large-core multi-mode fiber lasers, it is advantageous to use fibers with an approximately step-like refractive index profile as pointed out in U.S. Pat. No. 5,818,630. In contrast, rare-earth-doped fibers made by modified chemical vapor deposition (MCVD) tend to have a co-axial central dip in the refractive index profile as shown in FIG. 7a. In FIG. 7a the values for the refractive index serve only as an example and the exact refractive index depends on the fiber's glass composition. Note that in FIG. 7a only the refractive index for the core region and the immediately adjacent first cladding region are shown.

For fibers as shown in FIG. 7a, the gain may be higher for higher order modes compared to the gain for the fundamental core mode, especially if the rare-earth-ion distribution follows the refractive index profile, at least approximately. Moreover, a dip in the refractive index profile may produce a ring mode as the lowest order mode for the fiber core with reduced focussability compared to a mode with a gaussian intensity distribution.

Figure 7B:
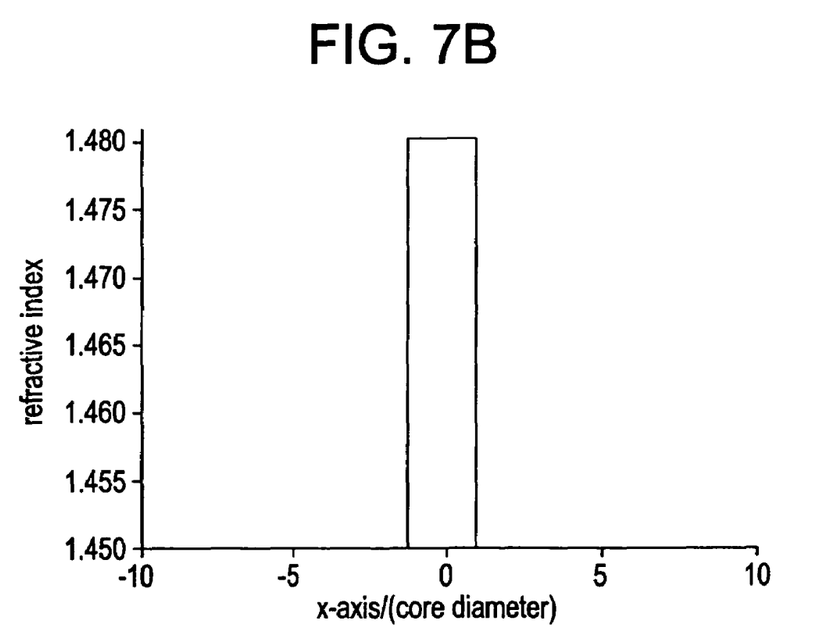
FIG. 7b is a diagram of the refractive index profile of an approximately step-index fiber.

In contrast, a fiber with a step-like refractive index distribution as shown in FIG. 7b is preferable. In practice, a step-like refractive index distribution can be generated by MCVD by increasing the doping level of the index raising dopants in the central core region before preform collapse. In the presence of dopant outgassing during fiber preform collapse a final refractive index profile as shown in FIG. 7b can be obtained. Alternatively, other fiber manufacturing methods can be implemented where the susceptibility to the generation of a central dip in the refractive index profile is less prevalent; for example outside vapor deposition (OVD) or vapor axial deposition (VAD) may be implemented for this purpose.

Figure 8:
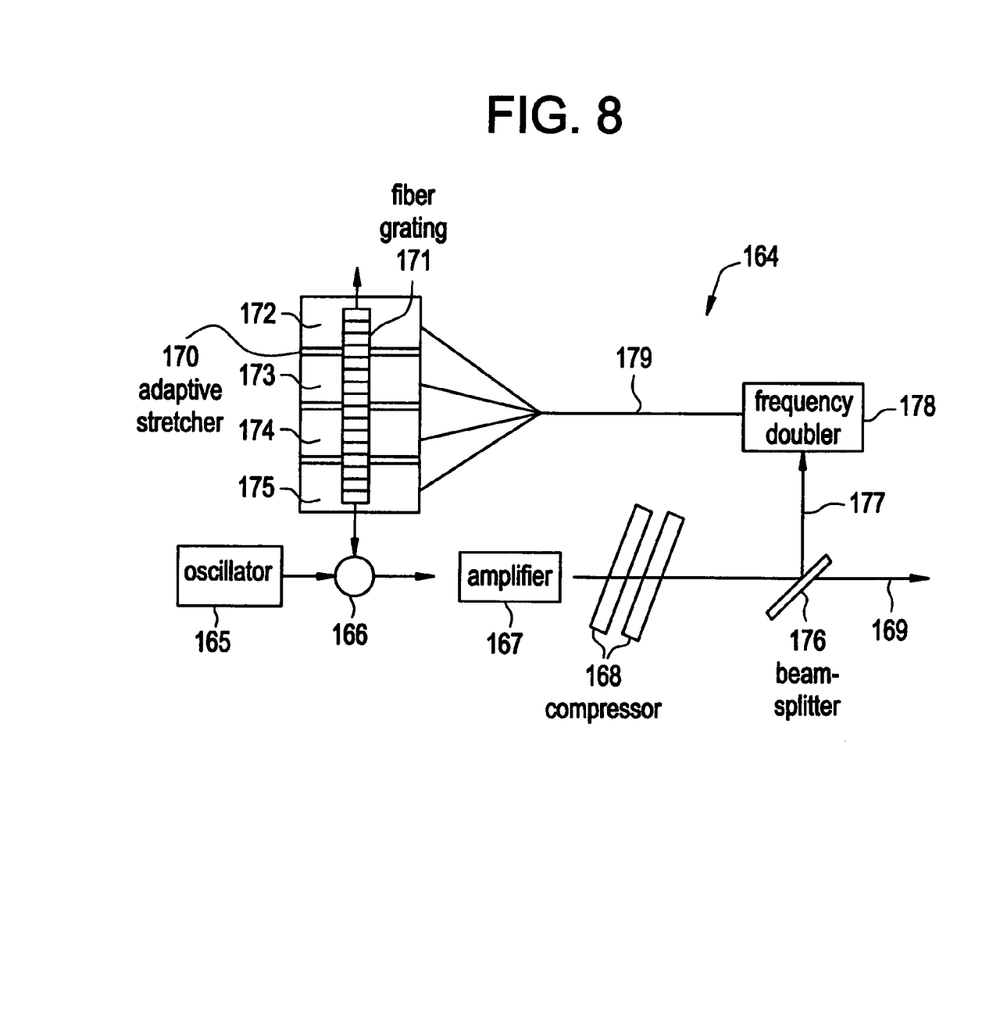
FIG. 8 is a diagram of a scheme for adaptive control of the group delay in fiber gratings in a chirped pulse amplification system.

FIG. 8 illustrates how chirped fiber Bragg gratings can be implemented to adaptively compensate any residual dispersion profile mismatch between a fiber grating stretcher and a bulk grating compressor, greatly improving the fabrication yield of chirped pulse amplification systems. Adaptive pulse compressors are known in the art, but because conventional adaptive compressor systems are based on complex and expensive bulk optics arrangements, they are generally not used in commercial laser systems. In contrast, an integrated and miniaturized fiber-based adaptive pulse stretcher has a great market potential.

Optical assembly 164 comprises an ultrafast oscillator 165 emitting short optical pulses. These pulses are injected into optical circulator element 166. Element 167 represents an optical amplifier and element 168 represents a bulk compressor; the output from the system is represented with arrow 169. Circulator 166 circulates the oscillator pulses into adaptive pulse stretcher 170. Adaptive pulse stretcher 170 comprises a chirped fiber Bragg grating 171 with an array of selectively electronically addressable segments 172–175. While four array elements are illustrated by way of example, any number of segments can be used. Because of the high quality of nonlinearly chirped fiber Bragg gratings, only a limited number of individually addressable fiber Bragg grating sections is required. For a 10 cm long grating, around 100–200 individually addressable fiber grating sections are sufficient.

Beam splitter 176 deflects a small fraction of the optical output beam 169 generating an optical beam 177. A frequency-doubler assembly 178 is then used to provide a feedback signal via electrical control line 179 to adaptively control the fiber array segments to maximize the doubled output power using general numerical algorithms.

Instead of frequency doubler 178, other nonlinear pulse characterization devices could be used to provide a feedback signal to the adaptive pulse stretcher. Such pulse characterization devices can comprise auto-correlators or frequency-resolved optical gating devices, just to name two examples. Not only the peak power, but also the pulse quality of the compressed pulses can thus be directly measured and optimized.

Adaptive control of the chirp inside fiber Bragg grating 171 is obtained by independently modifying the refractive index in each of the separate fiber sections 172–175. Mechanisms for index modification will be described in FIG. 9. Considering that the amount of chirp control possible with an adaptive fiber pulse stretcher 170 is relatively small, however, one skilled in the art will recognize that the dispersion profile of the fiber Bragg grating pulse stretcher needs to be as closely matched to the dispersion profile of the bulk grating compressor 168 as possible initially. Residual ripple in the group delay produced by the chirped fiber Bragg grating or any small mismatch between the dispersion profile of the stretcher/compressor assembly can then be adaptively corrected, allowing for the compression of stretched pulses down to near the bandwidth limit.

Figure 9A:
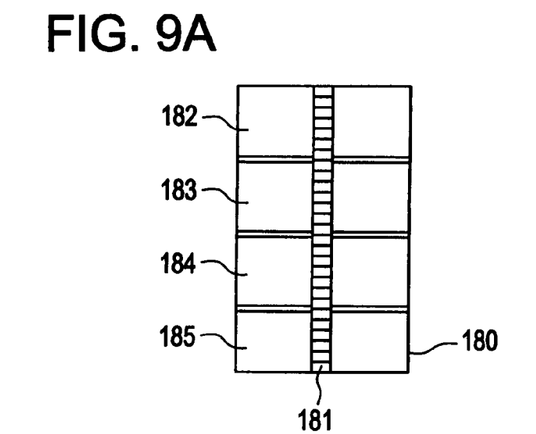
FIG. 9*a* is a diagram of a scheme for changing the temperature in adjacent sections of chirped fiber gratings for adaptive dispersion control.
Figure 9B:
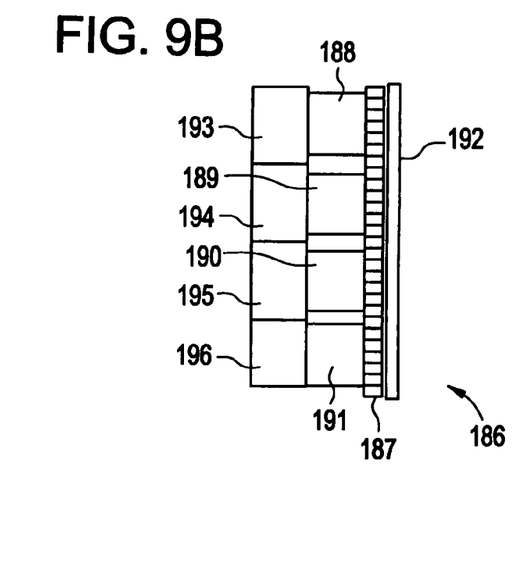
FIG. 9*b* is a diagram of a scheme for changing the stress in adjacent sections of chirped fiber gratings for adaptive dispersion control.
Figure 9C:
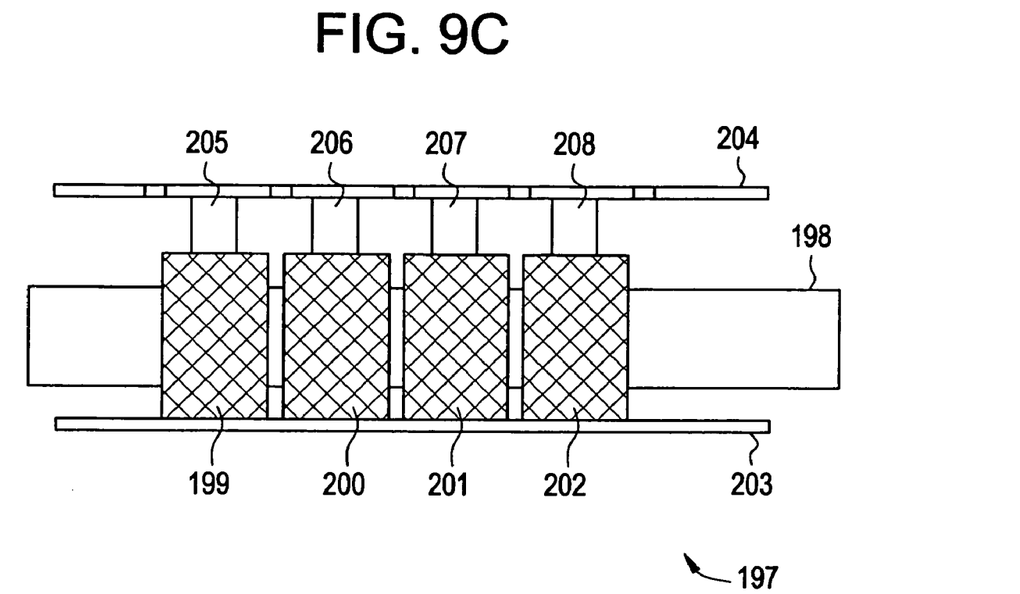
FIG. 9*c* is a diagram of a scheme for changing the local refractive index in adjacent chirped fiber grating sections by the use of resistive heating.

FIGS. 9a–c demonstrate various methods for modifying the refractive index in separate, individually addressable fiber grating sections. In FIG. 9a adaptive pulse stretcher 180 contains fiber grating 181 and allows modification of the refractive index of an array of fiber sections via thermal control. For example fiber Bragg grating 181 can be attached to an array of thermoelectric heater/cooler elements 182–185, which modify the refractive index profile according to the temperature profile applied by heater/cooling elements 182–185.

FIG. 9b illustrates an adaptive pulse stretcher system 186 containing fiber grating 187. Here piezoelectric elements 188–191 are used to produce controllable amounts of strain in adjacent fiber sections by pressing fiber grating 187 against flat plane 192. Elements 188–191 are attached to holders 193–196 to enable packaging of the optical assembly.

FIG. 9c displays yet another alternative embodiment for an adaptive pulse stretcher using resistive heating of sections of a fiber grating. Adaptive pulse stretcher 197 comprises fiber grating 198 with a number of metal coated sections 199–202. For example a combination of Ni and Au coating is appropriate. The electrically isolated sections can be manufactured by metal coating the whole grating length and then selectively etching away narrow isolating sections 210. The coating is further attached to common ground 203. A circuit board-like mask 204 with electrically conducting, though mutually electrically isolated, sections 205–208 is then positioned on top of the metal coated fiber grating sections and arranged such that individually controllable currents can be applied. In the present arrangement the current flows between sections 199/205, 200/206, 201/207 and 202/208 respectively. Resistive heating of the metal coating thus heats the individual fiber grating sections, producing proportional refractive index changes in the fiber grating sections as required for adaptive control.

By adaptively controlling the chirp in fiber grating pulse stretchers, large amounts of self-phase modulation can also be compensated. Self-phase modulation generally produces a nonlinear chirp in stretched and amplified pulses which is, to first order, additive to the pulse chirp and not compressible with a conventional stretcher/compressor assembly. However, because the chirp induced by self-phase modulation is additive to first order, it can be pre-compensated in an adaptive pulse stretcher. Indeed, since the amount of induced self-phase modulation depends on the amplified stretched pulse shape, the required fiber grating modification can be estimated from a measurement of the stretched pulse shape and a static (non-adaptive) fiber grating stretcher for self-phase modulation compensation can also be implemented.

Figure 10A:
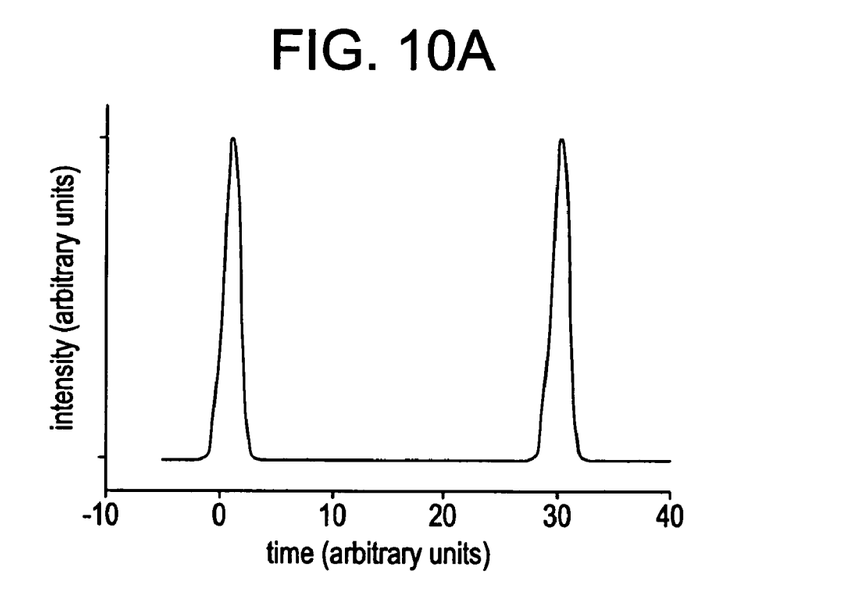
FIG. 10*a* is a diagram of a pulse train generated with a fiber grating pulse stretcher in conjunction with a bulk grating compressor.
Figure 10B:
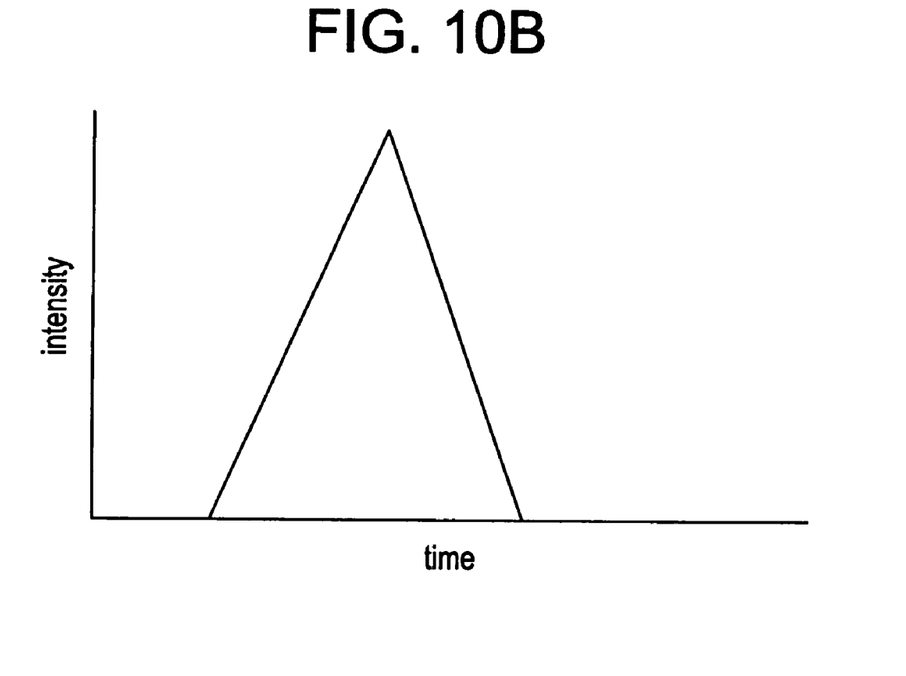
FIG. 10*b* is a diagram of a triangular pulse generated with a fiber grating pulse stretcher in conjunction with a bulk grating compressor.
Figure 10C:
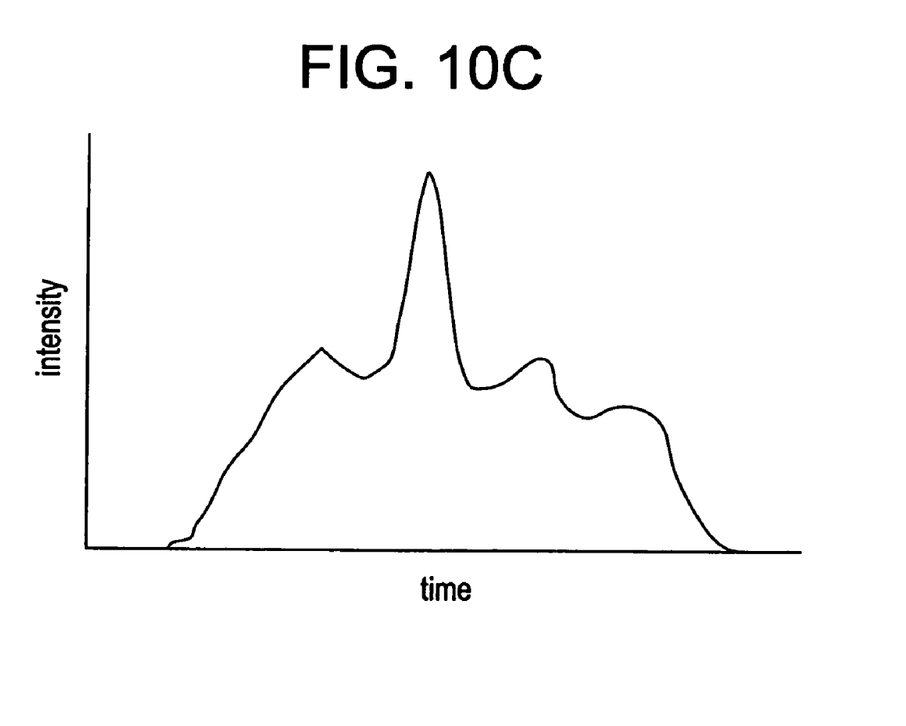
FIG. 10*c* is a diagram of a general arbitrary pulse form generated with a fiber grating pulse stretcher in conjunction with a bulk grating compressor.

For some machining applications, complex pulse shapes or pulse trains may be required to achieve optimum performance. Chirped fiber Bragg grating stretchers in conjunction with bulk grating compressors can also be implemented as general pulse shaping devices to produce such complex pulse shapes. In this case, fiber Bragg grating designs can be obtained directly from the required output and input pulse shapes using inverse scattering algorithms well known in the state of the art. Fiber Bragg gratings usually have complex continuously varying amplitude and phase structures with discrete phase jumps at various locations along the grating. This type of fiber Bragg grating can usually be written by a continuous write and translate system. For example, as shown in FIG. 10a, by appropriately controlling the phase and the chirp of a fiber Bragg grating, a double-pulse can be generated after compression with a bulk grating compressor. With appropriate fiber Bragg grating designs, the shape of each sub-pulse can be tailored as well as the delay between two pulses. With ten centimeter long fiber Bragg gratings, ns pulse separations can be achieved. This can be further increased if longer fiber Bragg gratings are used. Equally, well defined pulse trains can be generated to be used in micro-machining. Similarly, in FIG. 10b a triangular pulse shape is obtainable from a pulse shaping fiber Bragg grating. Generally, arbitrarily selectable pulse shapes, as shown in FIG. 10c, can be generated from pulse shaping fiber Bragg gratings. If high peak pulse powers are not required, a bulk grating compressor does not need to be implemented and appropriately shaped pulses can be extracted directly after reflection from a fiber Bragg grating.

In short, the above disclosure describes optimized fiber Bragg grating pulse stretchers allowing for 1) precise dispersion control, 2) compensation of self-phase modulation and 3) the generation of optimum pulse shapes for micromachining and other end uses via a chirped pulse amplification system.

Figure 11:
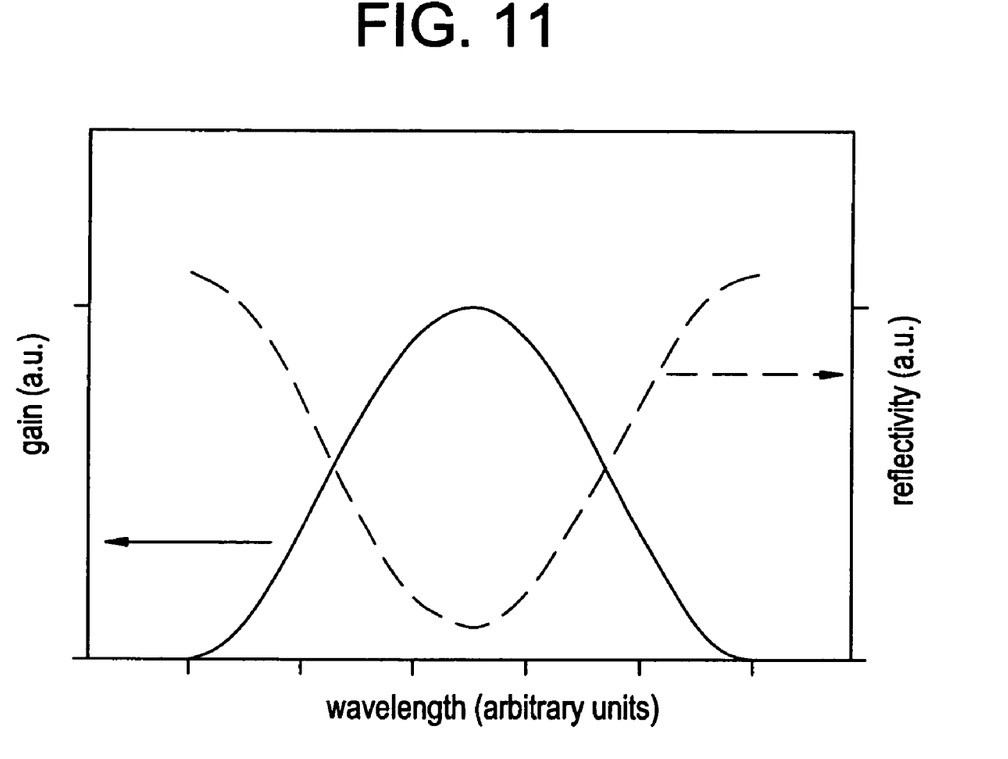
FIG. 11 is a diagram of the spectral reflection profile of a fiber grating pulse stretcher designed to counteract spectral gain-narrowing in a chirped pulse amplification system. The reflection profile is shown in relation to a generic spectral gain-profile of an optical amplifier.

In ultrafast optics applications, the generation of the shortest possible pulses from a chirped pulse amplification system is equally of prime interest. The obtainable pulse widths from chirped pulse amplification systems is limited by gain-narrowing in the amplifiers. Gain narrowing can be counterbalanced by fiber Bragg grating pulse stretchers that exhibit a reduction in reflectivity at the peak of the gain in the amplifier chain as implemented in a generic chirped pulse amplification system. This is further illustrated in FIG. 11. The combination of gain and reflectivity profiles as exemplified in FIG. 11 maximizes the spectral bandwidth of the amplified pulses minimizing the amplified pulse bandwidth. Moreover, whereas in FIG. 11 a relatively simple gain profile is shown, gain narrowing in more complex gain profiles can also be counterbalanced by appropriately designed pulse stretching fiber Bragg gratings. The optimum reflectivity profile is then determined by the largest amplified spectral bandwidth, for a given tolerable level of amplifier noise, i.e. any modulation of the reflection profile of the fiber Bragg grating pulse stretchers produces a reduction in the injected seed pulse energy into the amplifier chain. In practice a seed pulse energy reduction by more than 90–99% cannot be tolerated, because of the onset of significant amplifier noise in the output of the amplifier.

Figure 12:
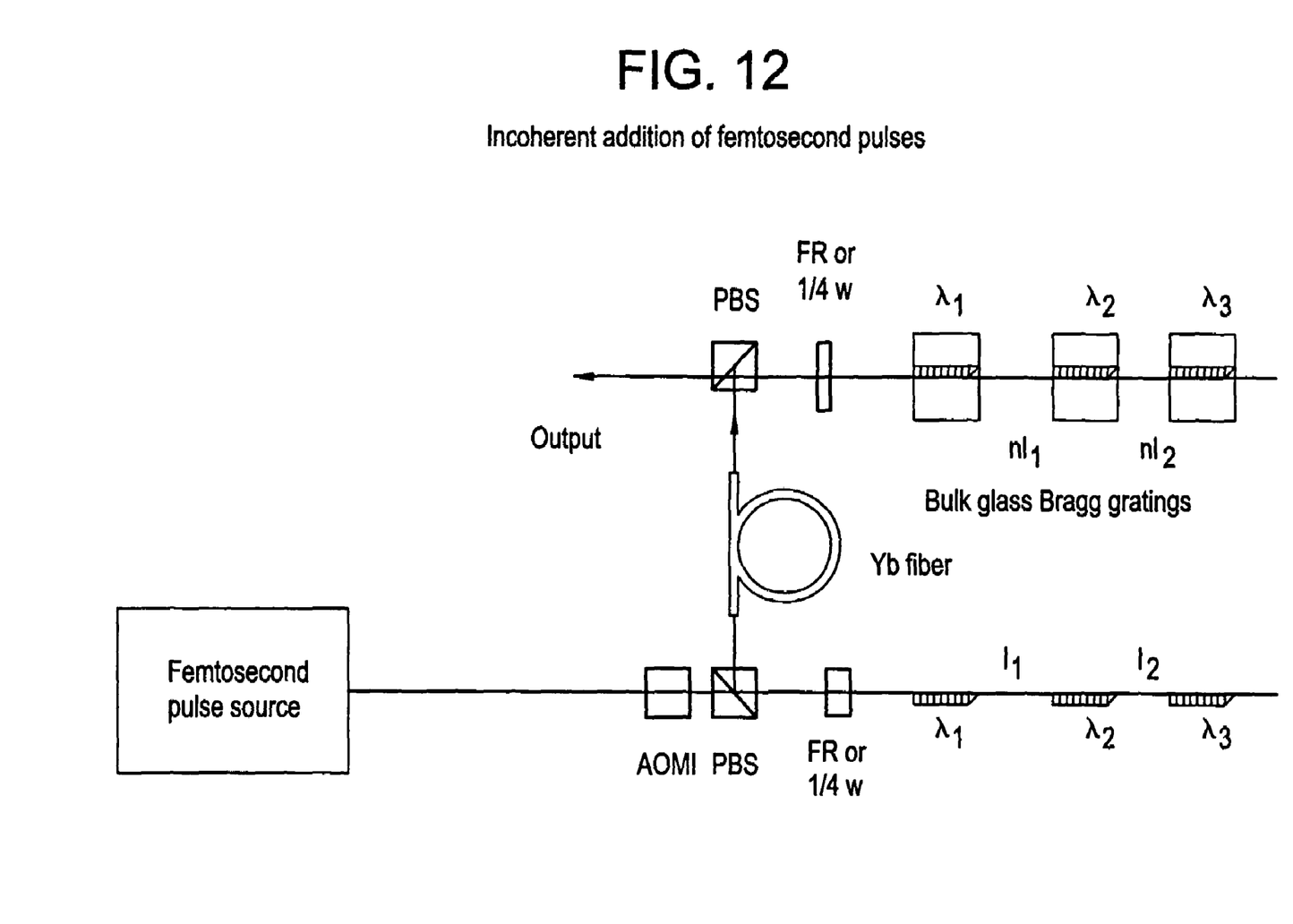
FIG. 12 is a diagram of an embodiment wherein a series of gratings separately stretch different portions of the input pulse spectrum.

A further embodiment shown in FIG. 12 focuses on increasing the possible energy and average power from ultrafast fiber lasers. A longer pulse envelope can be obtained by utilizing a series of chirped gratings that reflect at different wavelengths. After amplification a similar series of gratings can be placed to recombine/compress the pulses. As shown in FIG. 12, pulses from a femtosecond pulse source are passed through an acousto-optic modulator, a polarized beam-splitter and a Faraday rotator, then supplied to a series of chirped fiber stretcher gratings which operate on different portions of the input pulse spectrum. The spacings between the stretcher gratings can be $l_1, l_2, l_3 \ldots$. In order to reconstruct the pulses after amplification in, e.g., a Yb amplifier, the spacings between a series of complementary bulk glass Bragg grating compressors are set to $nl_1, nl_2, nl_3, \ldots$, where n is the refractive index of the fiber between the stretcher fiber gratings, assuming that the bulk Bragg compression gratings are separated by air. The reconstructed pulse is output via a second beam splitter. As previously mentioned, the reconstructed pulse is generally the result of incoherent addition of the separately amplified spectral components of the input pulse.

If the spacings between the compression and stretcher gratings are not equalized as described above, then multiple pulses will appear at the output. This can be beneficial for applications such as micromachining. By varying the stretching and compression ratios pulses with different pulse widths can be combined. A single broadband compression grating can be used if multiple pulses are desired.

This technique can also be used to increase the repetition rate. To increase the repetition rate by n times, n gratings would be used. The separation of these gratings would be equal to the time period between pulses T divided by n times the speed of light.

In this disclosure there are shown and described only the preferred embodiments of the invention and but a few examples of its versatility. It is to be understood that the invention is capable of use in various other combinations and environments and is capable of changes or modifications within the scope of the inventive concept as expressed herein. Further, it should be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

What is claimed is:

1. A polarization maintaining air-clad fiber, comprising:
   a core region;
   a material cladding region surrounding said core;
   an air-cladding substantially surrounding said first cladding region; and
   a layer surrounding said air cladding,
   where polarization maintaining operation of said fiber is obtained by the incorporation of stress producing regions that are fully disposed within and surrounded by said material cladding region.

2. A polarization maintaining air-clad fiber as claimed in claim 1, wherein said fiber comprises additional cladding regions.

3. A polarization maintaining fiber, comprising:
   a fiber core having a diameter >15 μm;
   a first cladding surrounding said core; and further including stress-producing regions incorporated therein;
   an air cladding substantially surrounding said first cladding; and
   a third cladding surrounding said air cladding.

4. A polarization maintaining optical fiber comprising:
   a fiber core;
   an inner cladding surrounding said core, said inner cladding having a cross-section comprising an outer surface having at least three-fold symmetry;
   a cladding region disposed about said core and about said inner cladding, said cladding region comprising a plurality of features disposed therein, said plurality of features forming an optical cladding for said core and said inner cladding; and
   a plurality of stress producing regions that induce birefringence in said fiber thereby producing polarization maintaining operation.

5. The optical fiber of claim 4, wherein said plurality of features comprise a plurality of holes.

6. The optical fiber of claim 4, wherein said plurality of features comprise a plurality of air-holes.

7. The optical fiber of claim 4, wherein said stress producing regions are disposed substantially symmetrically about said core.

8. The optical fiber of claim 4, wherein said plurality of stress producing regions comprise a pair of stress producing regions disposed on opposite sides of said core.

9. A polarization maintaining optical fiber comprising:
   a fiber core;
   a single ring of regions disposed about said core, said regions forming an optical cladding for said core; and
   a plurality of stress producing regions that induce birefringence in said fiber thereby producing polarization maintaining operation.

10. The optical fiber of claim 9, wherein said plurality of regions comprise a plurality of holes.

11. The optical fiber of claim 9, wherein said plurality of regions comprise a plurality of air-holes.

12. The optical fiber of claim 9, wherein said stress producing regions are disposed substantially symmetrically about said core.

13. The optical fiber of claim 9, wherein said plurality of stress producing regions comprise a pair of stress producing regions disposed on opposite sides of said core.

14. The polarization maintaining air-clad fiber of claim 1, wherein the core region has a diameter >15 μm.

15. The polarization maintaining air-clad fiber of claim 1, wherein the material cladding region has a cross-section having an outer surface having at least three-fold symmetry.

16. The polarization maintaining air-clad fiber of claim 1, wherein said air-cladding comprises a single ring of air-holes.

17. The polarization maintaining fiber of claim 3, wherein the first cladding fully surrounds the stress-producing regions.

18. The polarization maintaining fiber of claim 3, wherein the first cladding has a cross-section having an outer surface having at least three-fold symmetry.

19. The polarization maintaining fiber of claim 3, wherein the air-cladding comprises a single ring of air holes.

20. The polarization maintaining optical fiber of claim 4, wherein the fiber core has a diameter >15 μm.

21. The polarization maintaining optical fiber of claim 4, wherein each of said plurality of stress producing regions has a cross-section having an outer surface, and wherein said outer surface of each of said stress-producing regions is disposed within said outer surface of said inner cladding.

22. The polarization maintaining optical fiber of claim 4, wherein the cladding region comprises a single ring of said features.

23. The polarization maintaining optical fiber of claim 9, wherein the fiber core has a diameter >15 μm.

24. The polarization maintaining optical fiber of claim 9, wherein said plurality of stress producing regions are surrounded by an inner cladding that surrounds said core, and wherein said plurality of regions substantially surrounds said inner cladding.

25. The polarization maintaining optical fiber of claim 9, farther comprising an inner cladding that surrounds said core, wherein said plurality of regions substantially surrounds said inner cladding, and wherein said inner cladding has a cross-section having an outer surface having at least three-fold symmetry.

26. The polarization maintaining optical fiber of claim 9, wherein said fiber core has a first refractive index and said regions in said single ring have a second refractive index, said first refractive index being higher than said second refractive index.

* * * * *

UNITED STATES PATENT AND TRADEMARK OFFICE
CERTIFICATE OF CORRECTION

PATENT NO. : 7,257,302 B2  Page 1 of 1
APPLICATION NO. : 10/608233
DATED : August 14, 2007
INVENTOR(S) : Martin E. Fermann et al.

It is certified that error appears in the above-identified patent and that said Letters Patent is hereby corrected as shown below:

Column 2, line 5, delete "Nov," and insert -- Nov. --, therefor.
Column 8, line 66, delete "$1_b$ of $1_b$" and insert -- $1_b$ of $l_b$ --, therefor.
Column 11, line 64, delete "thermoelectric" and insert -- thermo-electric --, therefor.
Column 16, line 17, in Claim 25, delete "farther" and insert -- further --, therefor.

Signed and Sealed this

Third Day of June, 2008

JON W. DUDAS
*Director of the United States Patent and Trademark Office*